Figure 1:
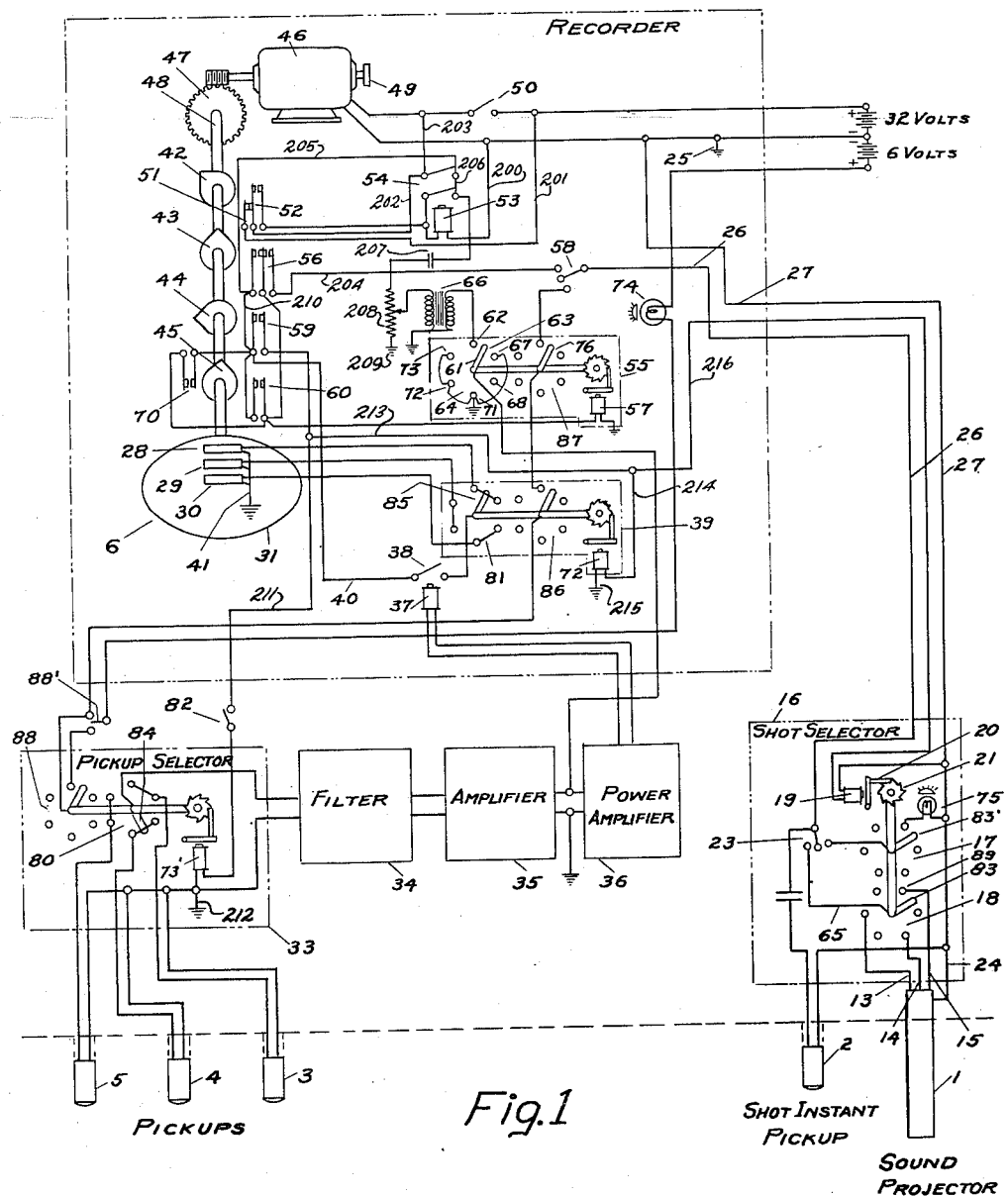

Aug. 3, 1937.  O. E. DUDLEY  2,088,588
SYSTEM FOR GEOLOGICAL EXPLORATIONS
Filed July 18, 1935  3 Sheets-Sheet 1

INVENTOR.
Oscar E. Dudley
BY
ATTORNEY.

Aug. 3, 1937.   O. E. DUDLEY   2,088,588
SYSTEM FOR GEOLOGICAL EXPLORATIONS
Filed July 18, 1935   3 Sheets-Sheet 2
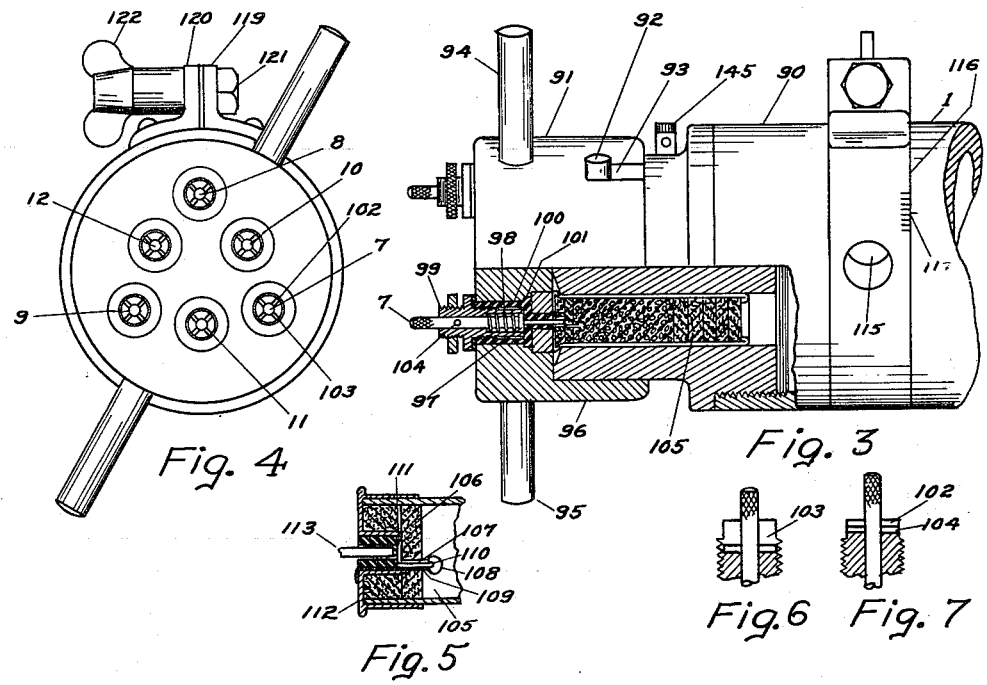
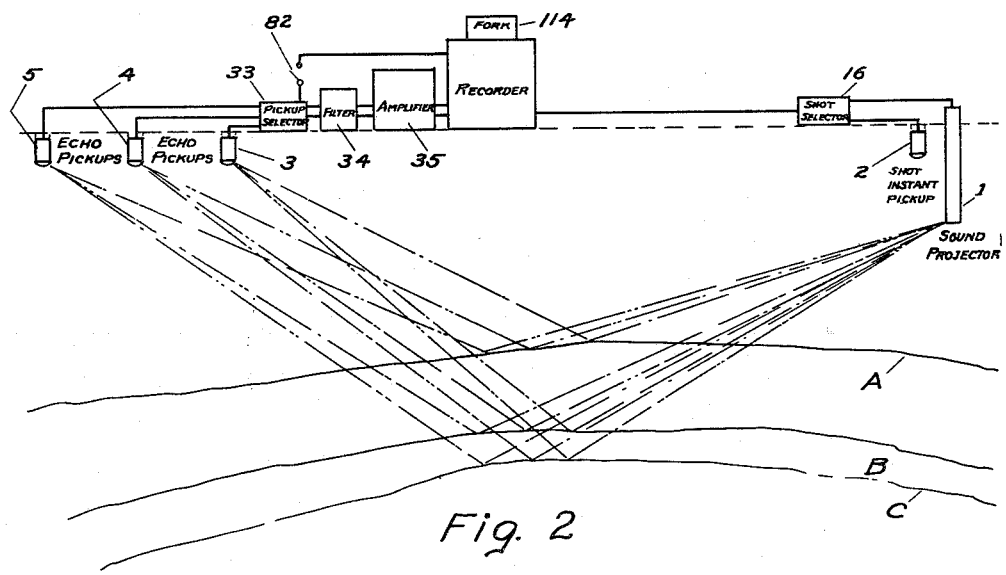
INVENTOR.
Oscar E. Dudley
BY
ATTORNEY.

Aug. 3, 1937.   O. E. DUDLEY   2,088,588
SYSTEM FOR GEOLOGICAL EXPLORATIONS
Filed July 18, 1935   3 Sheets-Sheet 3

SECTION A-A

INVENTOR
Oscar E. Dudley
BY
Ezekiel Wolf
ATTORNEY.

Patented Aug. 3, 1937

2,088,588

UNITED STATES PATENT OFFICE 2,088,588

SYSTEM FOR GEOLOGICAL EXPLORATIONS

Oscar E. Dudley, Hyattsville, Md., assignor to Submarine Signal Company, Boston, Mass., a corporation of Maine Application July 18, 1935, Serial No. 32,062

12 Claims. (Cl. 181—0.5)

The present invention relates to a means and method for locating mineral oils and ores and such other substances that are found in strata or layers beneath the surface of the earth.

Various means have been used in determining, in particular, the location of formations favorable for the accumulation of oil. Most of these that have been successful, however, have involved the use of large quantities of explosive materials that were placed in rather deep holes within the earth. In this method of detection of oil formations it is customary, on account of the great cost involved in the use of each explosive charge, to use a number of pickup devices spread around at various points over the area that is being observed and run wires from these devices to an indicating or a measuring apparatus. The whole system as employed involves a large running cost both on account of the cost of explosive that is used and on account of the elaborate preparation necessary before readings and observations can be made.

In the present invention the applicant has determined that observations of practically the same utility in determining the location of oil formations and ore bodies may be made without an apparatus of the nature described above, by the use of an explosive shell which may be discharged quite near the surface of the earth and by measuring the time interval between the direct pickup and the echo reflected rather than refracted from the strata or layer whose distances are being measured and analyzed.

In accomplishing this, in the present invention, the apparatus itself is simple, contained in only a few units and is further light in weight and easy to transport.

In the present invention provision is made for repeated observations of the same general character either from exactly the same position or from positions nearby so that the accuracy of the initial observations may be thoroughly determined and checked.

A further advantage of the present system is that the observations may be made entirely automatically, the system being such that three or more explosions may be successively produced and each may operate a recording system and produce individual and separate marks of the reflected echo or echoes that are received.

In the present system the explosion is preferably produced by a blank shell of the type either used in a high-calibre rifle or a shotgun. These explosions are produced by electrical ignition which is controlled by a firing cam that operates in conjunction with the indicating mechanism. The firing cam is so arranged in connection with the indicating mechanism that the shells are fired at a definite predetermined time, although the zero of the scale may be marked by the recording stylus operated from a pickup unit close to the sound-projecting device. A plurality of recording elements are provided, and while each may be operated from the same pickup devices, it is also possible to operate the recording elements from different pickup devices so that substantially different records may be made with successive explosions.

The system may be operated entirely automatically, as will be illustrated in the embodiment described in connection with the drawings attached to the present application.

Figure 8:
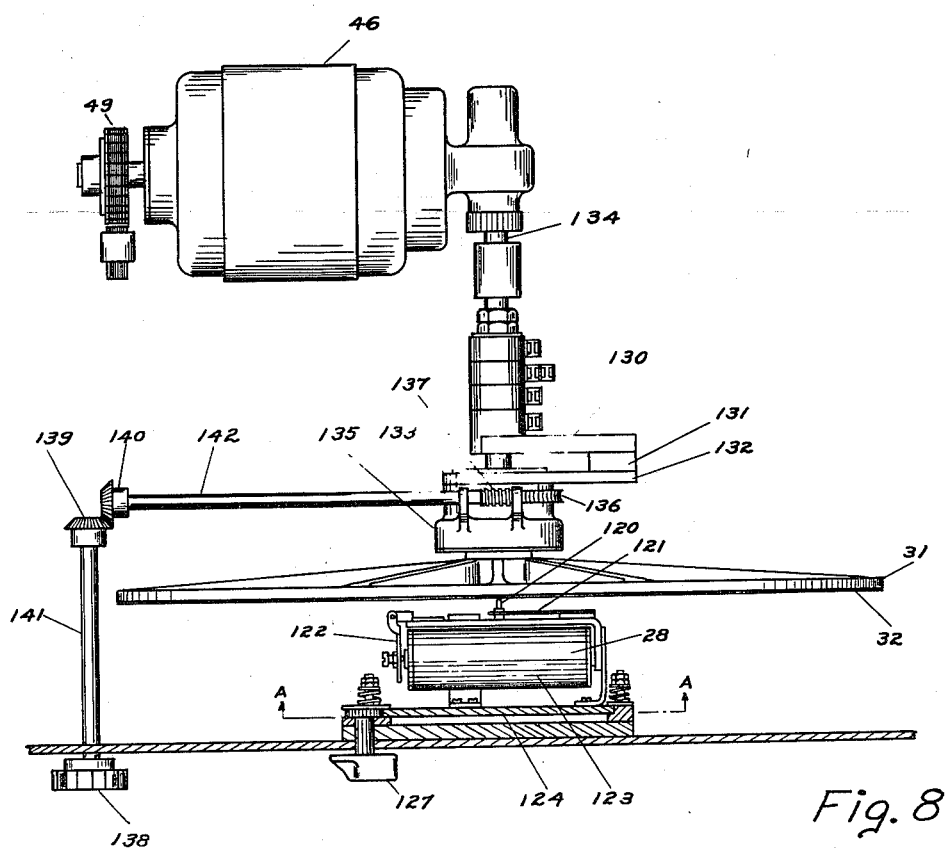
Figure 9:
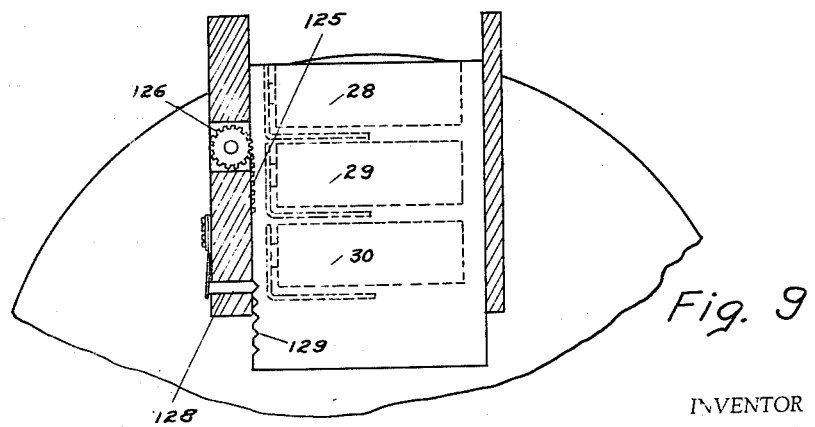

In the drawings, Fig. 1 shows diagrammatically the arrangement of the system; Fig. 2 shows a schematic arrangement as set up in the field; Fig. 3 shows a detail of the sound projector; Fig. 4 shows an end view looking from the left of Fig. 3; Fig. 5 shows a detail of the shell; Fig. 6 shows a detail of the firing contact in firing position; Fig. 7 shows a detail of the same element as Fig. 6 in a non-firing position; Fig. 8 shows the recording mechanism partly in section; and Fig. 9 shows a section taken on the line A—A of Fig. 8.

In the arrangement shown in Fig. 1, 1 indicates the sound projector by which the compressional wave energy is transmitted to the earth. 2 indicates the shot or sound instant pickup which is placed close to the sound projector. 3, 4 and 5 indicate three pickup devices which are used to receive the sound or compressional energy picked up after reflection from the reflecting surfaces in the earth and to transmit these reflections electrically through to the indicating device 6 in Fig. 1. The sound projector is shown in detail in Figs. 3, 4, 5, 6 and 7.

From Figs. 3 and 4 it may be noted that there are provided two groups of shells, the one group operated by the electrical firing pins 7, 8 and 9, and the second group operated by the firing pins 10, 11 and 12. The electrical connections indicated by the wires 13, 14 and 15, Fig. 1, are connected each respectively to one of these pins and each controls the firing of the shot with which the pin is connected.

The selection of the shot to be fired is controlled by the shot selector 16 which may be constructed of a standard selector switch comprising contact plates 17 and 18 associated with contact arms 83' and 83 which are moved by a step motor comprising the electromagnet 19 operating the pawl 20 which, in turn, operates the spur gear 21 to advance the contact arms in a standard manner one contact at a time. The plate 18, as indicated in the shot selector switch, has three contacts going to the leads 13, 14 and 15. The other three contacts not connected may be used for the second group of shots in the shot projector. The first selector switch plate 17, as is indicated, is connected to a light 75 which is used to synchronize the relative position of the shot selector with the other selector switches as will be described.

The switch 23, when thrown to the left, connects the shot selector for firing, while when thrown to the right, it is connected to determine the proper synchronism of the selector switches as will be explained. Besides the three connections 13, 14 and 15 for the sound projector 1, a fourth connection 24 is provided which is connected to the ground side of the system as indicated through the ground shown at 25. The shot selector switch is operated through the electromagnet 19 which is energized by the leads 26 and 27, the lead 27 being the ground lead and the lead 26 being connected to the positive side of the line through the switch in Fig. 1.

The indicator 6 is provided with three marking mechanisms 28, 29 and 30 which are mounted in a fixed position opposite the rotating disc 31, Fig. 8, whose face is provided with a marking paper 32 which may be a paper coated with wax or any other material suitable for a marking device. The marking relays are operated directly from the main line to which they are connected, although the operation may be by any other suitable means, as, for instance, directly or indirectly through proper power amplifiers from the pickup units.

In the system as shown in Fig. 1, however, the pickup units 3, 4 and 5 pick up the sound or compressional wave energy received and transmit such energy, translated, into electrical impulses through the pickup selector switch 33 to the filter 34, to the amplifier and power amplifier 35 and 36, respectively, from where it is impressed upon the relay magnet 37 which closes the main circuit to the marking relays 28, 29 and 30. When the switch 38 of the relay 37 is closed, the circuit is completed to one of the three marking styluses through the stylus selector switch 39 by means of the positive lead 40 and the ground 41.

The automatic operation of the system is controlled by means of cams 42, 43, 44 and 45 operating the switches positioned near the cams. The cams just mentioned are on the same shaft as the disc 31 of Fig. 8 and are operated by means of the motor 46 through the gear 47 mounted on the shaft 48 carrying all of the cams mentioned above.

The speed of the motor 46 may be carefully adjusted before observations are made by means of the small generator 49 generating a high frequency which is compared with a standard tuning fork of the known or adjustable frequency as, for instance, type 213, audio oscillator, General Radio Company type, by the zero-beat method. The motor is energized by means of the switch 50 which may be closed manually at any time. When this occurs and the shaft 48 begins to rotate, the cam 42 closes the contacts 52 which energizes the relay 53. Energizing the relay 53 closes the switch 54 which thereafter remains closed until the relay 53 is deenergized. This will not occur until after the switch 50 is again opened and the contacts 51 are opened. When the switch 50 has been closed and the cam 42 is moved around to a position that the contacts 52 are closed, the magnet 53 is placed directly across the line and energized from the 32 volt source through a circuit comprising the switch 50, the contact 52, the magnet 53 and the lead 200 from the right of the magnet. When the magnet 53 becomes energized, the switch 54 is drawn downward and closed, thus making it unnecessary for the switch 52 to remain closed in order to sustain energization of the magnet 53. Therefore, when the contacts 52 open again, current still flows through the magnet 53. In stopping the motor, the switch 50 is thrown open. However, the motor will still continue to function since it is connected across the 32 volt source by means of the line 201, the contacts 51 which are closed, the lead 202 and the lead 203, which completes the circuit about the switch 50. The motor will, however, stop when the cam 42 has opened the contacts 51. In this position the magnet 53 becomes deenergized since the magnet circuit, including the lead 200, the magnet 53, the switch 54, the contacts 51 and the lead 201, is broken by the separation of the contacts 51. The purpose of this arrangement is to insure that the system always starts and stops with the selector relays in the same relative positions.

The cam 43 operates the three contacts of the switch 56. When contact is made with the center contact element by the one at the left, the selector switch 55 has its switch arm 63 advanced one step over the contact plate 64 by means of the magnet 57. This in the operation of the system brings the arm 63 in contact with the contact 62 and at practically the same time the contact at the right of the switch 56 becomes connected with the other contacts resulting in the firing of one of the shells in the sound projector, since in this position the arm 83 rests on the contact 89.

In the position of the arm 63 of the shunt selector switch as just described above, the shot instant pickup device 2 is connected through the transformer 66 to the power amplifier unit 36 and this, as a result of firing one of the shells, picks up compressional or sound energy which, in turn, brings about the operation of the relay 37 controlling the operation of one of the marking relays that is selected by the selector switch 39. The circuit arrangement for the connection of the shot instant pickup through the power amplifier and the recorder is as follows: The lead 27 from the shot instant pickup goes to the negative side of the power source. The lead 26 from the shot instant pickup when the switch 58 is thrown upward is connected by means of the lead 204 to the switch 56 which, when the cam 43 is closed, makes further connection with the lead 205 through the connector 206 on the switch 53 and then to the condenser 207 and the resistance 208 to the ground 209 which returns through the ground 25 on the low side. While the selector switches 39, 33 and 16 are advanced only one contact per revolution of the disc 31, the selector switch 55 is advanced three contacts per revolution so that for one revolution of the indicator disc 31 the contact arm 63 is advanced half a revolution about the contact plate 64 and the contacts in the other selector switches are advanced just one step for the revolution of the disc 31. When the contact arm 63 reaches the position of the contact 67, the power amplifier unit becomes grounded at the input side, thus preventing any stray signals from operating any of the relay markers. This step takes place a little after the shot is fired, thus eliminating the signal traveling directly to the receivers from operating the indicating device. When the arm 63 has reached the position of the contact 68, this shunt or shortcircuit of the input of the power amplifier unit is again removed and the signal picked up by the pickup units 3, 4 or 5 may operate the magnet 37 and thus record the incoming echo. The operation of the selector switch 55 for this step is variably controlled by switch 70 the adjustment of which is shown more in detail in Fig. 8. The operation of the system in Figure 8 is described later and it will be sufficient to mention at the present time that the brush 130 in Figure 8 corresponds to the contacts 70 and that this adjustment is obtained by means of adjusting the relative position of the brush in connection with the cam with which it operates.

By means of the adjustable switch 70 the contact arm 63 may remain upon the contact 68 up to seven-eighths of a revolution. In the final position and beginning the second revolution the arm 63 comes to the position of the contact 71 at which points the power amplifier is again cut out of the circuit by shortcircuiting its input. Also for the position of the arm on the contacts 72 and 73 the same situation occurs. This eliminates the marking of the marking paper from stray records when no signal has been produced.

The cam 45 controls the operation of both of the contacts 60 and 70 which are used for the advancement of the shunt selector switch arm 63. The contacts 60 and 70, it will be noted, as well as the contacts at the left of the switch 56 are all in parallel, and by the proper adjustment of the cams 43 and 45 relative to one another the desired advancement of the selector switch arm 63 takes place. The cam 44 operating the contacts 59 energizes in synchronism the magnets 72, 73' and 19 in the following manner. The 32 volt source is applied to each of the magnets. The circuit to the magnet 73' is traced as follows: through the line 203, the switch 54 when closed, the lead 205, the lead 210, the contact 59, the lead 211, the switch 82 when closed, the magnet 73' and the ground 212. The circuit to the magnet 72 is closed in the manner described above through the contact 59, the lead 213, the lead 214, the magnet 72 and the ground 215. The circuit through the magnet 19 is closed by the same conductors as the magnet 72 through the conductor 213, the conductor 216, the magnet 19 and the ground return 27. Synchronism of the shunt selector switch 55, the pickup selector switch 33, the relay selector switch 39 and the shot selector switch can be observed by means of the lamps 74 and 75 when the switch 23 is thrown to the right, the switch 88' closed and the switch 58 thrown downward, placing all of the synchronizing selector plates 17, 86, 87 and 88 in a series circuit. In this set up when the indicator is rotating, the lights glow once every sixth revolution and all the selector switches are in their proper positions.

In the operation of the system the main switch 50 is closed and then the motor speed may be adjusted to its proper value by means of the synchronous generator 49 as explained above. The various selector switches may also be synchronized by throwing the relay synchronizing switch 58 down to its lowest position and the switch 23 to the right and closing also the synchronizing switch 88' for the pickup selector 33. The lights will glow when the switches are in synchronism, as it will be noted the lights are arranged in a series circuit across the six-volt battery supply. When it is ascertained that the synchronism is proper, the synchronizing switches are thrown to their other positions and the mechanism is ready to operate provided the firing pins of the sound projector are in position.

The indicator controls the complete operation, the switches 51 and 52 controlling the start-and-stop operation mechanism, as has been explained above, and the switch contacts 56 controlling the firing of the shot. The two contacts to the left of 56 at the moment of firing, or just before, connect the shot instant pickup 2 to the power amplifier 36 and thereby allow the operation of the relay magnet 37 for operating one of the three markers 28, 29 or 30. Shortly thereafter the contact 60 operating the magnet 57 moves the arm 63 to a position where the amplifier is grounded (contact 67) and thereby no indication can be impressed upon the markers.

The variable contacts 70, shortly after this, are brought together by cam 45 and this advances the arm 63 to the further contact 68, thus breaking the ground to the power amplifier and putting the whole circuit in condition to receive the sound picked up by the pickup units 3, 4 or 5. The time of advancing the arm 63 to this position is variably controlled by means of varying the position of the contact 70, as will be explained in Fig. 8. From the position of the contact 68 the arm 63 is next brought to the contact 71 by the closing of the contact 56 which again shunts or grounds the power amplifier and thereby makes it impossible for the markers 28, 29 or 30 to operate. This last operation is the beginning of the second revolution of the indicator.

In the second revolution of the indicating paper the arm 63 continues to be moved successively to the contact points 72, 73 by operation of contacts 60 and 70, respectively, and at the beginning of the third revolution of the indicator the arm 63 comes in contact with the contact 62 at which time the firing is again repeated. It will be noted, therefore, that the firing of the shot occurs once in two revolutions of the indicator.

As has been explained above, the selector switches 16, 33 and 39 are controlled by the cam 44 and the contacts 59. These selector switches are advanced one step for each revolution of the indicator and, as will be noted from the arrangement of the contacts on the plates 18, 80 and 81, these are similarly connected to the respective elements that they operate; every second contact in the plate 18 being connected to a firing pin; the contacts on the plate 80 being connected in pairs to the pickup units 3, 4 and 5; and the contacts on the plate 81 being connected in pairs to the markers 28, 29 and 30.

When the switch 82 remains open, it is obvious that the relay 73 is unenergized and under these circumstances the same pickup unit may remain connected to the filter circuit. If the pickup units are to vary with the firing of the shots, then the switch 82 is closed and after each shot is fired, a different pickup is connected to the recording circuit.

It should also be noted that during every second revolution of the indicator 6, the arm 83 working on the contact plate 18 connects the firing contacts with the firing switch so that as the arm 83 advances one step for a revolution of the indicator, it will be in position to fire the explosive once in every other revolution. Similarly, it should be noted that the contact arm 84 operating with the plate 80 selects a different pickup unit after every second revolution, and so also the contact arm 85 operating with the contact plate 81 with reference to the marking relays 28, 29 and 30.

In Figs. 3, 4 and 5 the sound projector mechanism is shown. This comprises a shell which includes a long tube 90 to which a firing head 91 may be attached. The head 91 is removable from the shell and is held to the shell by means of pin 92 which rests in a groove 93 in the head. For the purpose of removing the head, handles 94 and 95 are provided. The head is composed of a body portion 96 which is provided with a number of perforations. The firing pin is inserted in the perforation in the head and this includes in its entire assembly the pin 7 which is provided at its lower end with a collar 97.

The end of the pin going into the cartridge is somewhat narrower than the rear portion of the pin, and just behind the collar 97 there is provided a helical spring 98, the collar and spring resting in a cavity formed in the sleeve 99 through which the pin 7 may be moved up and down. The sleeve 99 is surrounded by an insulating bushing 100 which lines the inside of the perforation and extends in a flange into the head piece 96 whereby it is held in position as indicated at 101. The insulating bushing 100, as may be noted, is inserted from the inner end of the shell. This bushing is threaded to receive the sleeve 99. As indicated in Fig. 4 the sleeve 99 is provided with slots 102 and 103 cut at right angles to one another. One of these slots, as indicated in Fig. 7, is shallow and the other one deep.

The pin 7 is provided with a small cross pin 104 which is adapted to rest in one of these slots. When the cross pin 104 rests in the deep slot, the firing pin 7 is in contact with the explosive shell 105. When the pin rests in the shallow slot, it is out of contact and no firing can take place. The helical spring 98 pulls the pin inward at all times so that when the pin is not to be fired, it is pulled backwards and inserted in the shallow slot.

The construction of the shell is shown more in particular in Fig. 5. The shell 105 has an insulating plate 106 through which a small hole is provided for the two wires 107 and 109 connecting to the squib 108 which is inside the shell in the powder. The two leads 107 and 109 connect to a small platinum fuse 110 which is burned or becomes heated when current is applied.

The wire 107 connects to a plate 111 resting upon the insulating plate 106, and the wire 109 is brought upward and connected to a conducting plate 112 which grounds the shell to the frame or head. The end 113 of the pin 7 in the non-firing position is just above the contact 111 passing through a hole in the metallic plate to which no contact is made. When the explosive is to be fired, the end 113 of the pin 7 is allowed to come down on the plate 111 and the firing circuit is completed from the squib through the terminal 99, firing pin 7 and terminal 145. All of the other shells are similar and are fired in the same way.

In order to control the intensity of the pressure in the explosive chamber there may be provided within the tube 90 a small pressure release hole 115 over which the band or clamp 116 is placed to adjust the size of the opening 115. A gage 117 may be provided to allow marking or calibration of the amount of opening to the atmosphere. The clamping arrangement about the tube may be of a familiar construction with two flanges 119 and 120 extending upward from the band and being held together by means of the bolt 121 and the wing nut 122.

In Fig. 2 the system described in Fig. 1 is shown schematically with the sound projector unit 1, the shot instant pickup 2, the shot selector switch 16 as the transmitting end of the system and the echo pickups 3, 4 and 5 at the receiving end of the system. Along with this unit is the pickup selector 33 and the switch 82 for using or not using the same, the filter 34 and the amplifier and power unit 35. With the recorder is also shown the fork unit 114 by which the recorder may be synchronized.

The recording disc 32 must, of course, be rotated at a known speed in order for the position of the markings to be calibrated in proper distances and this may be obtained by synchronizing the recorder with some timing mechanism or synchronizing the motor speed with some known relation of the tuning fork so that the recorder will have the proper desired speed.

If in Fig. 2 the position of the strata A, B and C are being observed, it will be noted that three reflections are obtained at each pickup device, one from each of the reflecting surfaces so that with the use of three units successively nine reflections would be obtained, establishing the position of the three reflecting surfaces observed.

By the usual methods employed in geophysical observation the results of these readings will produce a measurement of the distance of these strata from the surface. In this way the variation in depth of the strata may be observed at various localities as well as the fact that the various strata themselves exist.

The details of the recorder are shown in Figs. 8 and 9. There is provided a disc 31 driven by the motor 46, upon which disc, as has been stated, is positioned the marking paper 32. The marking relays or magnets include the marking stylus 120 held away from the paper by a spring 121, the stylus itself being carried at the end of the bell-crank lever 122 which is operated by the magnet 123 when current is applied. The operation of the magnet 123 forces the marking stylus 120 upward, making a short mark upon the marking paper. The marking relays are mounted on a plate 124 at the edge of which is provided a rack 125 as indicated more clearly in Fig. 9. This rack meshes with the gear 126 which is manually operated through the handle 127. Rotation of the handle 127 will move the plate 124 upwards, as shown in Fig. 9, and the plate may take any one of the five positions provided by the pin 128 resting in the notches 129 of the plate. This makes it possible after using the relays and operating the system in one position to move the entire group of three relays to different positions and make another set of observations.

The recording mechanism in Fig. 8 also shows the variable adjustment for the brush 130. The brush 130 is carried by the support 131 which is attached to an extension 132 from the plate 133. The plate 133 is mounted concentric with the shaft 134 driving the entire mechanism but is not rotated with it. It is mounted on a bearing 135 which is provided with a gear 136 meshing with a worm 137 that may be moved by turning the handle 138 through the bevelled gears 139 and 140 at the ends of the shafts 141 and 142, respectively; the shaft 142 having the worm 137 at its end. Rotation of the handle 138 varies the position of the brushes 130 about the circumference of the cam and controls thereby the position at which the brushes 130 operate in the movement of the recording disc. The brush 130 corresponds to the contacts 70, and in the manner just described the variable adjustment of the position of the contact 70 is obtained.

The entire mechanism described in the present application is of such a character that it may be easily transported and set up for use and observation. The pickup units are not intended to be placed very far away from the position where the projector is inserted into the ground so that echoes rather than the refraction of the sound is observed. The projector is intended to be put into the ground only a comparatively few feet so that very little digging is necessary before this unit may be installed.

It will also be noted that the system may be varied in some respects without departing from the spirit of the invention, as, for instance, the mechanical relays may be eliminated and electronic relays employed particularly in the operation of the marking stylus.

The filter employed in the present system is designed to cut out everything below thirty cycles and passing everything above sixty cycles. This range may be varied and, in fact, the system may be so set up that one observation can be made passing everything above thirty cycles and another observation made passing everything below sixty cycles; or, if desirable the filter may be entirely eliminated and all of the frequencies observed.

Having now described my invention, I claim:

1. A system for observing geological formations of the type described comprising a sound-projector unit, a plurality of pickup units for picking up the sound transmitted by the projector and reflected from reflecting surfaces that are being observed, a recording device for recording said reflections and means operated in conjunction with the operation of said recording device for controlling the operation of said sound projector.

2. A system for observing geological formations of the type described including a sound-projector unit, means for receiving the sound after reflection from the surfaces that are being observed, means controlling the operation of said sound projector including means for controlling the instant of the emission of the sound and recording means operated in synchronism therewith.

3. A system for observing geological formations of the type described comprising a sound-projector unit, an instant pickup unit positioned near the sound-projector unit, a plurality of other pickup units for picking up the sound after reflection from the surfaces that are being observed, means for controlling the operation of said sound projector and recording means operated in conjunction with the operation of said sound projector and by said pickup units.

4. In a system for observing geological formations, a recording and control device including a plurality of selector switches, a plurality of cams, contacts positioned to be operated by said cams, a recording disc, recording means positioned to produce a record on said recording disc and a single means for operating said disc and cams, and means connecting said contacts with said selector switches for operating the same.

5. In a system of the type described, a recording and control mechanism comprising a plurality of selector switches, a plurality of cams, means for positively operating said cams, each cam having associated therewith a plurality of electrical contacts, means controlled by one of said cams operating a contact for firing a sound projector element and means connecting the rest of said contacts for operating individually said selector switches.

6. In a system of the type described, a recording and control device comprising a single shaft, a plurality of cams and a recording disc carried by said cams, a plurality of switch contacts operated by said cams, a plurality of selector switches, said selector switches being operated by one of said cams and the contact corresponding therewith and a further selector switch operated by the other of said cams and the contacts controlled therewith.

7. In a system of the type described, a recorder and control mechanism including a recorder disc having a marking paper mounted thereon and a plurality of recording elements positioned when operated to produce markings on said paper, means for rotating said disc continuously at a uniform rate and means including an explosive sound projector for intermittently producing sound waves every second revolution of said disc and means also controlled in synchronism with the rotation of said disc for connecting a pickup means with said marking elements at preselected times.

8. In a recording and control device for a sound projector having individual explosive elements and a group of pickup units adapted to receive the sound projected by the sound projector, a single control means having a plurality of operating cams and a recording disc controlled thereby, a plurality of marking elements positioned opposite said recording disc adapted to produce marks on said marked paper, a group of contacts operated by said cams, a plurality of selector switches associated with said sound projector, said pickup devices and said marking elements respectively, one of said cams and contacts connected for operating all of said units and a further selector switch operated by other of said contacts for controlling the operativeness of said marking elements.

9. In a system of the type described, a recorder and indicator device for controlling the operation of a sound projector having a group of individual explosive elements and a group of pickup units for picking up the sounds after reflection from the surface whose distance is to be measured including a single control means having a recording disc operated thereby and a plurality of selector switches, means including a plurality of cams operated by said single control means for exploding a sound-producing element every other revolution of the indicator and means also operated by said control means for connecting a marking element to said pickup units at the time of firing and disconnecting said elements until just before the time that the reflected signal is to be received.

10. In a system of the type described, a recorder comprising a shaft having a recording disc at the end thereof, a recording paper mounted on the face of said disc, a plurality of recording relays having styluses operated thereby and means for moving said relays laterally of said disc to position said styluses at different points in the disc.

11. In a system of the type described, a recording device comprising a disc, means for rotating said disc at a uniform speed, a recording paper mounted on the front of said disc, a plurality of marking styluses positioned just over said paper, a plate carrying said styluses and having a rack at the side thereof, a spur gear meshing with said rack and means for operating said spur gear to move said styluses transversely of said disc.

12. In a system of the type described, a recording and control device comprising a shaft having a recording disc at the end thereof, a plurality of cams mounted on said shaft, a plurality of contacts mounted adjacent to said cams and operated thereby, a bearing element positioned concentric with said shaft but independent thereof, said bearing element carrying a contact arm mounted thereon and adapted to be operated by one of said cams and means for advancing or retarding said contact element with respect to said cam to control the relative position of the operation of said contact element by said cam.

OSCAR E. DUDLEY.